US012705209B2

(12) United States Patent
Higgins et al.

(10) Patent No.: US 12,705,209 B2
(45) **Date of Patent: *Aug. 11, 2026**

(54) DISTRIBUTED QUERY EXECUTION AND AGGREGATION ACROSS MULTIPLE DATASETS

(71) Applicant: Morgan Stanley Services Group Inc., New York, NY (US)

(72) Inventors: Luke A. Higgins, Silver Spring, MD (US); Robert R. Bruno, Palm Harbor, FL (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,436

(22) Filed: Mar. 8, 2024

(65) Prior Publication Data

US 2024/0211437 A1 Jun. 27, 2024

Related U.S. Application Data

(63) Continuation-in-part of application No. 18/138,011, filed on Apr. 21, 2023, now Pat. No. 11,954,068, and a continuation-in-part of application No. 18/138,014, filed on Apr. 21, 2023, now Pat. No. 12,197,386, and a continuation-in-part of application No. 18/138,013, filed on Apr. 21, 2023, now Pat. No. 12,189,576, said application No. 18/138,014 is a continuation of application No. 17/727,764, filed on Apr. 24, 2022, now Pat. No. 11,645,231, said application No. 18/138,013 is a continuation of application No. 17/727,764, filed on Apr. 24, 2022, now Pat. No. 11,645,231, said application No. 18/138,011 is a continuation of application No. 17/727,764, filed on Apr. 24, 2022, now Pat. No. 11,645,231.

(51) Int. Cl.
*G06F 16/13* (2019.01)

(52) U.S. Cl.
CPC .................................... *G06F 16/13* (2019.01)

(58) Field of Classification Search
CPC ....................................................... G06F 16/13
See application file for complete search history.

(56) References Cited

U.S. PATENT DOCUMENTS

| | | | | | |
|---|---|---|---|---|---|
| 5,133,068 | A * | 7/1992 | Crus | G06F 16/2365 | |
| 5,499,359 | A * | 3/1996 | Vijaykumar | G06F 16/24565 | 707/696 |
| 5,826,257 | A * | 10/1998 | Snelling, Jr. | G06F 16/284 | |
| 6,112,209 | A * | 8/2000 | Gusack | G06F 16/2228 | 707/999.102 |
| 6,239,802 | B1 * | 5/2001 | Lahey | G06F 9/451 | 715/810 |
| 6,457,000 | B1 * | 9/2002 | Witkowski | G06F 16/24553 | 707/999.102 |

(Continued)

*Primary Examiner* — Charles Rones
*Assistant Examiner* — Huen Wong
(74) *Attorney, Agent, or Firm* — Weitzman Law Offices, LLC

(57) ABSTRACT

Computer-implemented methods and systems are disclosed for receiving and indexing a plurality of files for later querying, for dynamically generating scripts to be executed during a query of a data store, and for horizontally distributing a query and aggregating results of the distributed query.

16 Claims, 9 Drawing Sheets

(56) References Cited

U.S. PATENT DOCUMENTS

| | | | | |
|---|---|---|---|---|
| 8,548,983 | B1 * | 10/2013 | Ahmed | G06F 16/24544 707/802 |
| 8,554,761 | B1 * | 10/2013 | Ahmed | G06F 16/24537 707/802 |
| 10,599,635 | B1 * | 3/2020 | Gunn | G06F 16/258 |
| 10,761,813 | B1 * | 9/2020 | Echeverria | G06F 8/34 |
| 11,169,997 | B1 * | 11/2021 | Debo | G06F 16/2428 |
| 11,657,050 | B1 * | 5/2023 | Hong | G06F 16/273 707/714 |
| 2002/0038315 | A1 * | 3/2002 | Yokouchi | G06F 16/273 |
| 2002/0095408 | A1 * | 7/2002 | Cheng | G06F 16/284 |
| 2002/0194196 | A1 * | 12/2002 | Weinberg | G06F 16/258 |
| 2005/0027507 | A1 * | 2/2005 | Patrudu | G06F 40/30 704/1 |
| 2009/0049060 | A1 * | 2/2009 | Konik | G06F 16/217 |
| 2009/0144320 | A1 * | 6/2009 | Weinberg | G06F 16/284 707/999.102 |
| 2009/0193006 | A1 * | 7/2009 | Herrnstadt | G06F 16/221 707/999.005 |
| 2010/0005048 | A1 * | 1/2010 | Bodapati | G06F 16/215 706/47 |
| 2010/0106747 | A1 * | 4/2010 | Honzal | G06F 16/283 707/E17.005 |
| 2010/0250497 | A1 * | 9/2010 | Redlich | G06Q 10/06 707/661 |
| 2012/0215766 | A1 * | 8/2012 | Gorelik | G06F 16/248 707/E17.014 |
| 2013/0124505 | A1 * | 5/2013 | Bullotta | G06F 16/332 707/E17.014 |
| 2014/0059084 | A1 * | 2/2014 | Adams | G06F 16/9024 707/E17.011 |
| 2015/0213043 | A1 * | 7/2015 | Ishii | G06F 16/211 707/741 |
| 2015/0278219 | A1 * | 10/2015 | Phipps | G06F 16/2358 707/711 |
| 2017/0357693 | A1 * | 12/2017 | Kumar | G06F 16/24556 |
| 2018/0218031 | A1 * | 8/2018 | Wong | G06F 16/2425 |
| 2019/0018983 | A1 * | 1/2019 | Anderson | G06F 21/64 |
| 2019/0228014 | A1 * | 7/2019 | Liu | G06F 16/2456 |
| 2020/0143112 | A1 * | 5/2020 | Martinez | G06F 40/295 |
| 2020/0201860 | A1 * | 6/2020 | Vogelsgesang | G06F 16/24537 |
| 2020/0278977 | A1 * | 9/2020 | Halstead | G06F 16/285 |
| 2023/0418978 | A1 * | 12/2023 | Sublett | G06F 40/174 |

* cited by examiner

DISTRIBUTED QUERY EXECUTION AND AGGREGATION ACROSS MULTIPLE DATASETS

CROSS-REFERENCE TO RELATED APPLICATIONS

This application is a continuation-in-part of and claims priority to co-pending U.S. patent application Ser. No. 18/138,011 (now U.S. Pat. No. 11,954,068 issued on 9 Apr. 2024), Ser. No. 18/138,013 (now U.S. Pat. No. 12,189,576 issued on 7 Jan. 2025), and Ser. No. 18/138,014 (now U.S. Pat. No. 12,197,386 issued on 14 Jan. 2025), all filed on Apr. 21, 2023 and titled "DATA INDEXING FOR DISTRIBUTED QUERY EXECUTION AND AGGREGATION", "DYNAMIC SCRIPT GENERATION FOR DISTRIBUTED QUERY EXECUTION AND AGGREGATION", and "DISTRIBUTED QUERY EXECUTION AND AGGREGATION, respectively. Those applications are each a continuation of and claim priority to co-pending U.S. patent application Ser. No. 17/727,764 (now U.S. Pat. No. 11,645,231 issued on 9 May 2023), filed on Apr. 24, 2022 and titled "DATA INDEXING FOR DISTRIBUTED QUERY EXECUTION AND AGGREGATION". All of these applications are hereby incorporated by reference in their entirety.

FIELD OF INVENTION

This disclosure relates to systems and methods for generating, structuring, and executing queries on a data store, and more specifically, to systems and methods for preprocessing a data query to improve efficiency, distributing the data query to a cloud of processors, and post-processing the results to respond to the query.

BACKGROUND

In the Structured Querying Language (SQL) or other relational database management systems (RDBMSs), there are a variety of functions that may be called, some of which return a single record (such as a SELECT on a field that acts as a unique key), some of which potentially return a multitude of records (such as a SELECT on a non-unique field, or on a JOIN of multiple tables), and some of which return single values derived from a data set (such as a COUNT of all records that match a criterion, or a SUM of all values in a particular column for records that match the criterion).

Most RDBMSs function very well even when querying tables with millions of records comprising terabytes of data. However, these solutions are highly dependent on proper indexing to avoid a need to iterate through every record to see if that record matches the query, and often fails to allow more sophisticated search techniques, such as search by regular expression ("regex"). Even with excellent indexing, existing solutions often break down when attempting to execute queries involving trillions of records comprising petabytes of data. Existing solutions for querying such massive data sets, such as Elasticsearch, may require massive clusters of servers and yet still have trouble effectively performing commands of greater sophistication, such as those requiring a JOIN of multiple tables, or those depending on partitioning of data.

As a result, there are advantages to having a system that provides speed and sophistication to big data queries, but doing so efficiently; avoiding the need for a proportional investment in hardware and achieving speed benefits beyond those that would result solely from increasing the number of computing clusters working in parallel.

SUMMARY OF THE INVENTION

A system for receiving and indexing a plurality of files for later querying is disclosed. The system comprises one or more data stores and non-transitory memory comprising instructions. When executed, the instructions cause processors to receive a plurality of files to be stored in the one or more data stores and store each file from the plurality of files in a bucket that exclusively stores files received during a predetermined window of time. The system periodically indexes a plurality of keys from the plurality of files by establishing a two-tiered index for each key, comprising an index dictionary and a Bloom filter, such that for every value of every key from the plurality of keys, there exists an entry in the index dictionary for that key indicating which files of the of plurality of files have that value for that key, and such that the Bloom filter for that key has that value inserted. Among other features, the Bloom filter allows a query to be received comprising a Boolean OR/AND/NOT of a value for a key, and if the value has not been inserted in the Bloom filter for that key, the query fails before downloading any of the plurality of files from the one or more data stores; for more efficient time-based file searching; and for the created index dictionary to be stored in the one or more data stores in a same format as the plurality of files, and even generated by the same query process that the indexing otherwise facilitates.

A system for dynamically generating scripts to be executed during a query of a data store is also disclosed. The system comprises a server comprising one or more processors and non-transitory memory comprising instructions. When executed by the processors, the instructions cause the processors to receive a query comprising a time window of files to be searched, key values to search on, and one or both of a filter selecting a subset of the files to be searched and an aggregation of data from all of the files or from all of the files that are filtered. In response, the system dynamically generates a script based on contents of the query, optimizing the script from a template to build up only features necessary to satisfy the query; and distributes the generated script horizontally to a plurality of computing devices that will execute the query by calling the generated script on each of the files to be searched. Various optimizations are provided in the dynamically generated script.

A system for distributing a query and aggregating results of the distributed query is also disclosed. The system comprises one or more data stores, a distribution server comprising one or more processors, a plurality of computing devices, each computing device being associated with at least one data store of the one or more data stores, and non-transitory memory comprising instructions. When executed, the instructions cause processors to receive a dynamically generated script representing a query of files in the one or more data stores and transmit the dynamically generated script to each computing device of the plurality of computing devices. The system directs each computing device of the plurality of computing devices to perform the query on a subset of files in the one or more data stores and receives from each computing device a subset of results based on execution of the dynamically generated script on the subset of files. The system may aggregate the subsets of results into a final result that represents a set of records that satisfy a query that was used to dynamically generate the script or that contain statistical summary information on records based on a query that was used to dynamically generate the script; and transmits the final result for storage and provision to a user who wrote the query.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
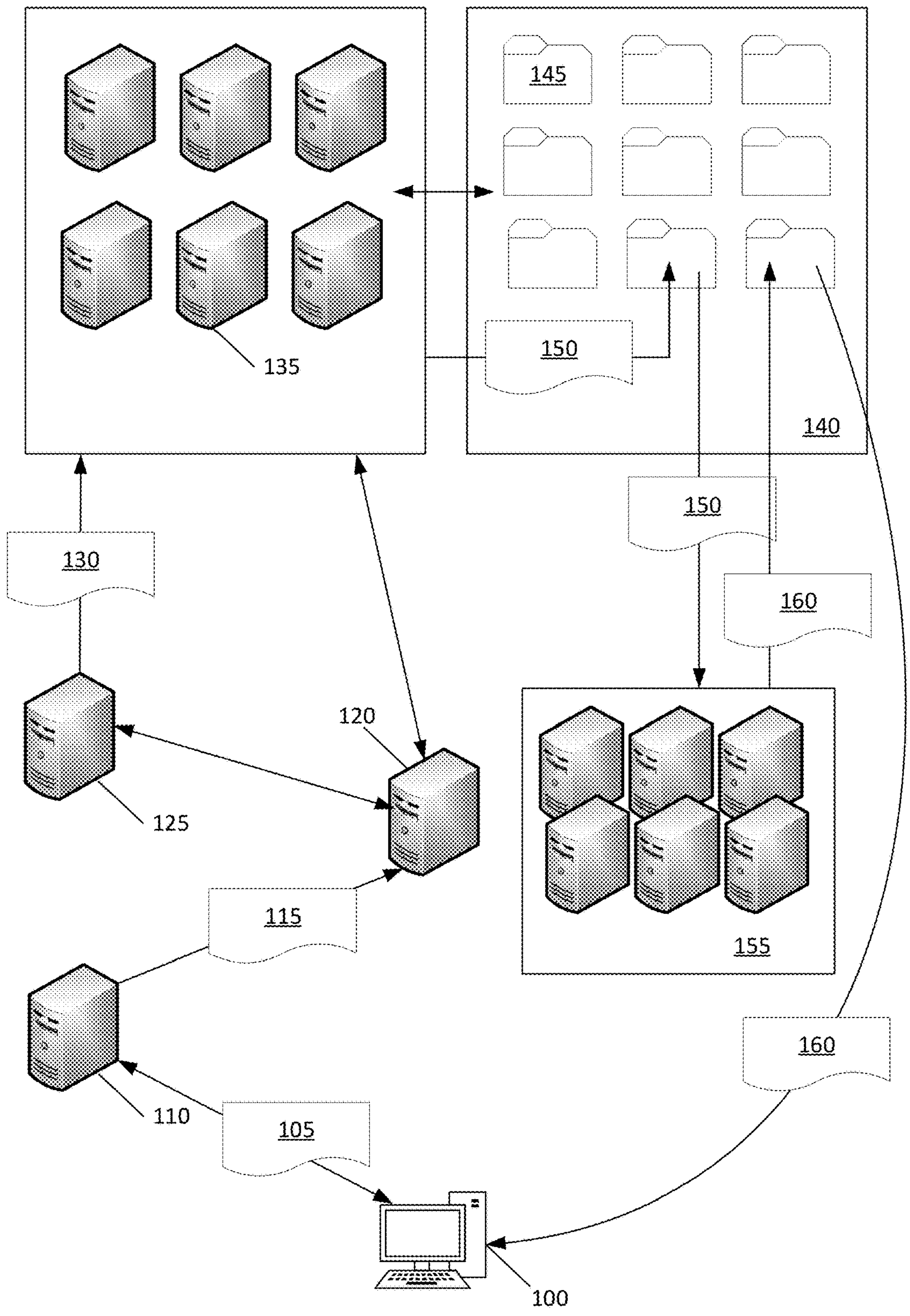
FIG. 1 illustrates, in simplified form, a system of computing devices used to receive a query, pre-process the query, distribute the query, aggregate the results of the query, and return the results to a human user.

In order to address the limited querying functionality in prior art systems, a system is provided to facilitate queries across staggering quantities of data in a filesystem-like construct.

The data to be queried is preferably stored in a NOSQL format such as Apache Parquet, JavaScript Object Notation (JSON), or another columnar format that does not require a formal relational database construct with tables or external schema, and can be stored in a generic "data lake" without concern for organization, such as the storage services that might be provided by Amazon S3 or other cloud-based storage providers. Despite the lack of an SQL or SQL-like backend, the system allows an end user to create queries including SQL-like functions, such as select for a value in a column, select by regular expression being satisfied by a value in a column, group by value in a column, group by regex being satisfied a value in a column, joining on a column across two tabular formats, count of records having a value in a column, set of all unique values in a column, count of unique values present in a column, count of each value in a column, sum of values in a column, concatenation of fields with a delimiter, ratio of one column or sum of columns to another column or sum of columns, least value present in a column, greatest value present in a column, applying a filter to records that would otherwise be returned by a select, quartile statistics of the values in a column, median value in a column, mean value in a column, standard deviation of values in a column, and other statistics or manipulations of results. End users need not be familiar with any particular querying language such as SQL, nor with programming in general, but instead might need only understand the JSON format and fields of a custom querying language to be use within said format, or might even construct a query by using a web-based graphical user interface (GUI).

For example, the following JSON object can be used as a query to pull HTTP request records and determine a variety of valuable statistics for later analysis such as, for each IP address, the total number of requests, total bytes sent, first and most recent times requested, and so on during the previous day:

```
json_config = {
    "log_type": "http",
    "begin":
int(1000*datetime.datetime(yesterday.year,yesterday.month,yest
erday.day,0,0,0).timestamp( ) ),
    "end":
int(1000*datetime.datetime(yesterday.year,yesterday.month,yest
erday.day,23,59,59,999999).timestamp( ) ) ,
    "s3_output_format": "multi",
    "key": {
        "columns": [
            {"name" : "source_ip", "type" : "raw" },
            {"name" : "dest_ip", "type" : "raw" },
            {"name" : "dest_port", "type" : "raw" },
            {"name" : "web_host", "type" : "raw" },
            {"name" : "http_method", "type" : "raw" }
                ]
        },
    "enrichments": [
        {"name" : "q_ips_source_ip",
"enrichment_source":"q_ips", "enrichment_key":"source_ip",
"enrichment_path":"reference/q_latest_dagg.json"},
    ],
    "output_columns": [
        {"output_name" : "key", "type": "concat",
"input_columns": ["source_ip", "dest_ip", "dest_port",
"web_host", "http_method"], "delim" : ","},
        {"output_name" : "network_tuple", "type": "concat",
"input_columns": ["source_ip", "dest_ip", "dest_port"],
"delim" : ","},
        {"output_name" : "local_dest", "input_column":
"local_dest", "type": "pass_through", "preprocess" : "lower"},
        {"output_name" : "local_source", "input_column":
"local_source", "type": "pass_through", "preprocess" :
"lower"},
        {"output_name" : "session_count", "type": "count"},
        {"output_name" : "datetime", "input": "begin", "type":
"metadata"},
        {"output _name" : "first_seen", "input_column":
"datetime", "type": "least"},
        {"output_name" : "last_seen", "input_column":
"datetime", "type": "greatest"},
        {"output_name" : "sensor", "input_column": "sensor",
"type": "set"},
        {"output_name" : "http_status_code", "input_column":
"http_status_code", "type": "set", "preprocess" : "forceint"},
        {"output _name" : "http_request_body_len",
"input_column": "http_request_body_len", "type": "sum"},
        {"output_name" : "http_response_body_len",
```

-continued

```
        "input_column": "http_response_body_len", "type": "sum"}
            ]
            ,
            "filter_query" : [
                {"subquery": { "is_q" : {"enrichment":
        "q_ips_source_ip", "values": [None]}}}
                            ],
        }
```

After the user submits a query using a GUI or otherwise through an application programming interface (API), an optimized script is dynamically generated in Python (or a similar scripting language) based on the user query and on the features of the custom querying language that have been invoked by that particular query. The generated script is horizontally distributed to a cluster of computing devices, and executed by each in parallel. As a result of the horizontal scaling and parallel computation, trillions of records containing petabytes of data can be queried in a matter of minutes and useful data is provided to the user potentially while the user waits during a same session, instead of being processed and returned to the user hours or days later.

Depending on the nature of the query and the quantity of results, the results might be immediately provided to the end user via the GUI, might be transformed into a Parquet or JSON format and provided to the end user to download, might be routed to a separate destination for further processing, or might be saved in a format that allows recursive or iterative queries to be performed on the results of previous queries.

As a result of all of the above, an organization desiring to make a massive amount of data searchable and summarizable need only obtain a distributed storage medium and convert their data into the Parquet, JSON, or similar format, and immediately increase the ability of internal analysts to query the data and obtain statistics regarding that data. The ease of compressing Parquet and similar file formats without affecting any storage framework further increases the efficiency of the system.

Turning to the overall physical structure of the disclosed computing system, FIG. 1 illustrates, in simplified form, a system of computing devices used to receive a query, pre-process the query, distribute the query, aggregate the results of the query, and return the results to a human user.

As depicted in FIG. 1, a user interface on a client computer 100 may be used to submit a query 105 via an API. The query 105 may, in a preferred embodiment, be typed into a text box in a web-based GUI and submitted by clicking a button that calls a JavaScript function to submit the query via the API. In other embodiments, more specialized software may take advantage of the API instead of a web browser; software may incorporate a dynamic linked library (DLL) that extends the API into a same language the software is written in; or the query definition may be submitted by other means, such as saving the query in a text file and uploading the text file.

The query 105 is preferably JSON based, with a number of required and optional fields. Required fields in a preferable embodiment include a beginning timestamp and an ending timestamp (to take advantage of time-based indexing and reduce the scope of a search), the columns to be included in the output of the query, the type of log files to limit the search to, the output format (single file or separate files), and either a key describing how to group data being obtained (for example, group by a particular field value or group all records matching a particular regex) or a filter (in order to retrieve full records matching a criterion instead of only obtaining some data from them). If a key has been provided, a filter may additionally be provided anyway to further refine the query.

For example, the following query could be used to search for all SMTP records of emails sent by an SMTP server on the date Dec. 1, 2021, identify the sender email address of each email via a regex, and count the number of emails sent by each email address, using that address as a key for grouping the output:

```
{
    "log_type": "smtp",
    "begin":
int(1000*datetime.datetime(2021,12,1,0,0,0).timestamp( ) ),
    "end":
int(1000*datetime.datetime(2021,12,1,23,59,59,999999)
            .timestamp( ) ),
    "s3_output_format": "single",
    "key": {
        "columns": [
            {"name" : "smtp_mailfrom",
             "type" : "regex_group",
             "regex": ".*?@((.{1,}\.){1,}[^>]{1,})" }
        ]
    },
    "output_columns": [
        {"output_name" : "count", "type": "count"}
    ]
}
```

A web server 110 receives the query 105 via the API and may perform initial validation or optimization tasks on the query 105. For example, the data may be initially validated to confirm that it is in the JSON format and can be parsed, that it contains all required field names, that all field names are correct and contain no typographical errors, and so on. If there are errors in the structure of the query itself, they may be recoverable by replacing one form of punctuation with another or one misspelled word with a known querying keyword that appears to have been meant. If the columns included in the query key indicate that the query concerns potentially sensitive or legally protected data, the server 110 may also check user entitlements sent along with the query 105 to confirm that the user is permitted to access the data that would be returned by the query, and prevent the query from being performed if permission is absent or remove prohibited columns from the query while retaining permitted columns. If a required field is absent, it may nonetheless be possible to perform the query by including a default value for that field, such as setting the "end" to the present and the "beginning" to 24 hours previously, if beginning and ending timestamps are omitted from the query.

Any of the above checks or failsafes may result in a query that is somewhat changed from the initially submitted query, resulting in a validated query 115. In other embodiments, no changes may be performed, and the original query 105 may continue to be used without modification.

The validated query 115 or original query 105 is forwarded from the web server 110 to a queuing server 120 that tracks queries which are to be performed when a cluster of computing devices 135, or even multiple such clusters operating in parallel, that will actually perform the query are still busy with a previously submitted query. In a preferred embodiment, the Ray clustering solution is used to control each of the computing devices in unison and distribute tasks among them.

While waiting for the cluster of computing devices 135 to become available, a Python generation server 125 generates a custom Python script 130 to be used specifically for the validated query 115 or original query 105, based on the contents of that query, according to a method described further below in relation to FIG. 3. In alternative embodiments, languages other than Python might be used, such as Perl, PHP, Ruby, or similarly interpreted scripting languages. In yet other embodiments, it is conceivable that a compiled language might be used to create an executable or interpretable program, such as C, C++, Java, etc.

When the cluster of computing devices 135 becomes available, the Python script 130 is forwarded to each of them, according to a method described further below in relation to FIG. 5.

Each computing device 135 has access to at least a portion of the data storage 140. As previously mentioned, in a preferred embodiment, Amazon S3 acts in this capacity and provides the storage. The storage 140 is generally unstructured and can act as a "data lake" with various raw files 145 having different internal formats and significances, captured or produced by different sensors or software, indiscriminately inserted into the storage. Some indexing of the inserted files is performed, according to a method described further below in relation to FIG. 2. Although, in a preferred embodiment, each of the files 145 is in the Apache Parquet format, the files could equally be stored in JSON format, or in another format that organizes data into one or more records, each with defined fields of data, such as a Comma Separated Value (CSV) database, some forms of Extensible Markup Language (XML), or other simple tabular or markup data formats. One advantage of allowing JSON input as an option is that the ultimate output of each query is by default in the JSON format, and this allows for recursive querying, a query that operates solely on the results of a previous query.

As each computing device 135 executes its instance of the Python script 130, it generates results 150 based on its portion of the storage 140. The portion of storage may be defined by limited access—for example, if the storage 140 is distributed across multiple locations and a computing device 135 only has access to one of these locations. The portion may instead, in a preferred embodiment, be the result of a division of a keyspace between the devices 135. For example, a key value in data may be hashed and assigned to a particular computing device 135 for processing based on the hash falling within a certain range assigned to that particular computing device 135. The outputs 150 from these scripts 130 may optionally be forwarded to a re-aggregation server or cluster of servers 155 to be combined and/or processed into a final result 160, according to a process described further below in relation to FIG. 6. For example, executing the example query provided above (for tracking sent email counts), a first computing device searching a first region of storage may have discovered two emails sent by johndoe@example.com, and a second computing device searching a second region of storage may have discovered three more email sent by johndoe@example.com. In order to accurately provide a count on the requested key, the re-aggregation server or cluster of servers 155 would need to track counts for each key value in each result 150 and use them to generate results 160 showing that the email address had sent five emails during the query time window. For queries that do not involve mathematical operations to summarize or provide data statistics, such as a query for all records matching a filter, the re-aggregation server may simply generate a final result 160 that is the union or concatenation of all results 150 that were provided to it. In a preferred embodiment, however, no re-aggregation server is necessary. Instead, results 150 are stored in the storage 140 and made available for an end user to download and process in any order at the end user's convenience. This asynchronous and divided result may often be necessary when a query may take hours to be performed and return such a large dataset that the entire result cannot be stored in a single device's volatile memory at one time.

Ultimately, the individual results 150 or final results 160 are either directly transmitted to the request user's computer 100 or, preferably, are sent to the storage 140 to be obtained by the user at a later time or interacted with in other ways, such as by a query that acts exclusively on these results to further aggregate or generate statistics related to the initial query. In a preferred embodiment, the final result 160 is stored in the JSON format, though in other embodiments, other formats might be used, such as Parquet, XML, plaintext, or other formats suitable to store and present the requested information. In a preferred embodiment, the results format is JSON or a similar compatible format to enable a recursive process of executing a first query, then executing a second query operating on the output generated by the first query, further aggregating or refining results.

Although a particular division of functions between devices is described with relation to the systems depicted in FIG. 1, above, other configurations are possible in which functions are divided among devices differently. For example, some or all of the functions ascribed to the user's computing device 100, the web server 110, the queueing server 120, the Python generation server 125, and the re-aggregation server 155 could conceivably be performed by a single device with multiple threads executing different software modules simultaneously.

Alternatively, each system or device from among the web server 110, the queueing server 120, the Python generation server 125, and the re-aggregation server 155 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme. What does remain of importance is that there are multiple computing devices 135 in a cluster to distribute the query among them and re-aggregate the results after each device has produced its individual result.

Data Ingestion and Indexing

Although indexing of all files is not necessary for a query to be performed, lack of an index will require every file in the storage 140 to be independently checked for possible satisfaction of selection and filtering criteria provided by the user.

Figure 2:
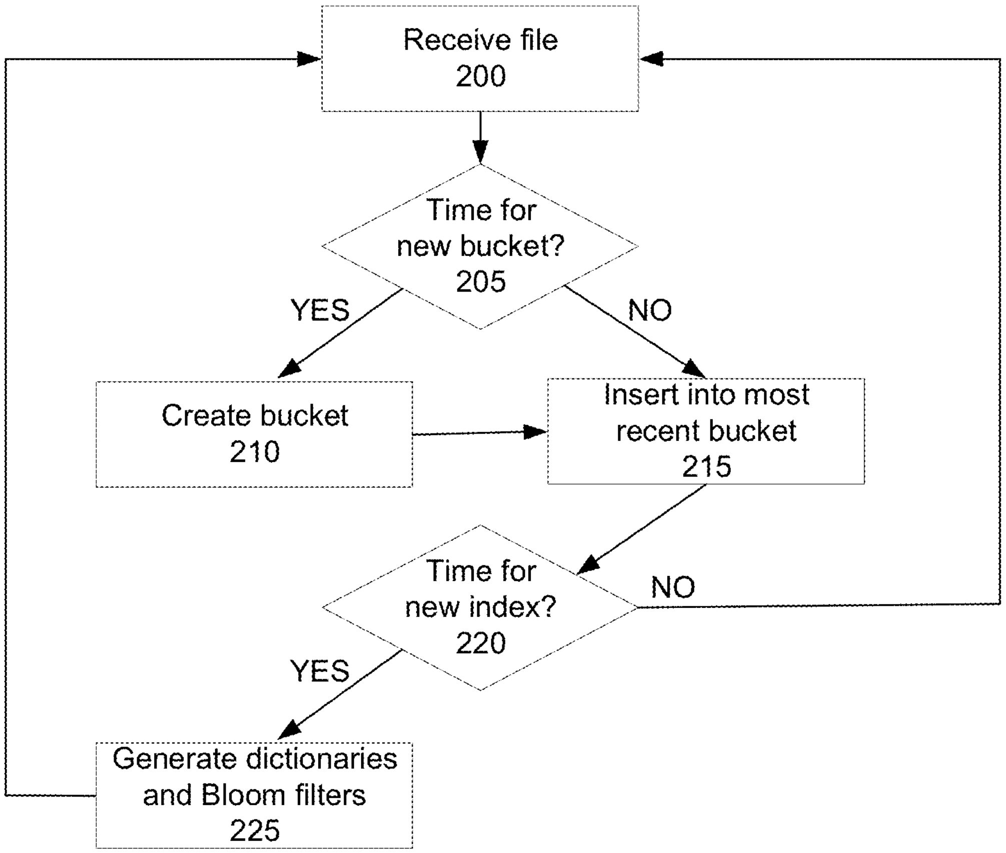
FIG. 2 depicts, in simplified form, a method of indexing and organizing files to facilitate future queries.

FIG. 2 depicts, in simplified form, a method of indexing and organizing files to facilitate future queries.

In a preferred embodiment, the storage 140 is organized into a series of "buckets" such that all files received during a given hour of a given day go into the same bucket, to facilitate time-based queries. Additional sub-buckets may be provided within each bucket based on file type or log type, source of the file, a value of a commonly accessed column, or other criteria. Further, buckets based on a particular unit or interval of time may be further sub-divided into more granular units of time, such as sub-buckets for each hour within a day bucket, or sub-buckets for each minute in an hour bucket. Each file stored is given a unique identifier to be used within the index.

Whenever a new file is received (Step 200), the system checks whether enough time has elapsed for a new bucket to be created (Step 205). As previously mentioned, this is, in a preferred embodiment, after one hour has passed since the last new time-based bucket was added, though shorter or longer lengths of time may be used for each bucket window if there are higher or lower volumes of data to be indexed. If the time has elapsed, a new bucket is created (Step 210).

In either event, the file is inserted into the most recently created bucket and the system may also determine any relevant sub-bucket (Step 215) as described above, based on file type or log type, source of the file, a value of a commonly accessed column, or other criteria.

In some embodiments, indexes may be regularly generated by a distributed query, according to the methods described above and below. For example, in order to index every email sent by an SMTP server by sender or by recipient, a query to group every email by sender or recipient and output a column that is a concatenation of every unique ID of every email that was within that group would result in an index that could be consulted in future queries by sender or recipient. In a preferred embodiment, the generated indexes are themselves stored in the same storage 140 as the underlying data for the sake of simplicity. In other embodiments, it may be desirable to have a specialized fast retrieval storage for the index to further improve efficiency.

In a preferred embodiment, these generated indexes are generated once per day, such that the software checks whether the current indexes are more than 24 hours old (Step 220) and if so, begins to generate the new indexes. The preferred interval of one day corresponds to the preferred interval bucket size, so that each newly generated index is relevant to the contents of the newest bucket. If a different bucket size, such as an hour or a week is used, a different indexing frequency may be preferred as well.

At the same time that each value of each key column (or a numerical offset that can be used to look up the value in an array) is inserted into the dictionary-based index, that value or offset is also inserted into a Bloom filter for that key (Step 225) that tracks whether a given value for a key has been indexed. Although a Bloom filter always has a small possibility of returning a false positive and reporting that a value has been inserted when it actually was not, the inability to have a false negative and the fast lookup time on a Bloom filter allows for a search on for a key value that is not present to short circuit even faster and fail even before consulting the dictionary table of key values.

In a preferred embodiment, each index, both the dictionary and Bloom filter portions, is horizontally distributed (Step 230) to ensure that each computing device 135 has access to the index.

Although the time-based checks whether to add new buckets to the storage (Step 205) and whether to generate indexes (Step 220) are conceptually described as if they are triggers called when a file is received, various embodiments might schedule a cron job or other process to perform these tasks at the intended time independent of insertions into storage.

Query Preprocessing and Python Generation

Once all data has been inserted into storage (and, if it will be indexed, that has been completed as well), the system can begin performing queries for records or data aggregations of that data.

Figure 3:
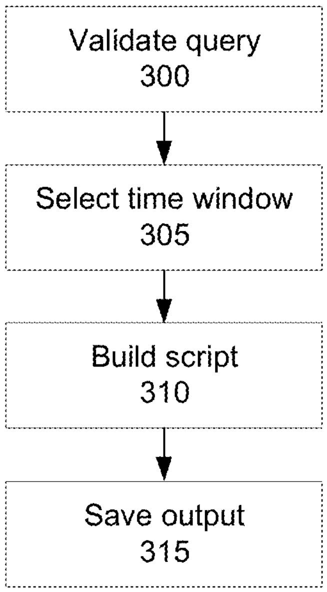
FIG. 3 depicts, in simplified form, a method of dynamically generating a script to be executed by each querying device.

FIG. 3 depicts, in simplified form, a method of dynamically generating a script to be executed by each querying device.

Initially, the query is checked (Step 300) for any contents that may interfere with insertion into a Python template (or template written in another scripting language), such as quotes or other special characters that may need to be escaped with backslashes or removed; use of Python keywords that may need to be quoted, escaped, or removed; or any other feature that may cause unexpected behavior when inserted into a script that will be interpreted and executed.

The required time window (both beginning and end) is used to select a set of buckets to which the search will be limited when the script is executed (Step 305). Because it is possible that files or logs gathered by a sensor may have been delayed somewhat before being committed to disk or to other long-term storage, additional buckets may be added despite the intention that they represent windows of time that do not actually overlap with the query window. For example, if logs are to be searched that arrived between midnight and 1 a.m. on a given date, the additional buckets for 1 a.m. to 2 a.m. and 2 a.m. to 3 a.m. might be included, solely to handle the possibility that data originally generated between midnight and 1 a.m. did not arrive for ingestion and indexing until after 1 a.m. Depending on the source of data, on the extent of any intermediate processing the data may have undergone, and especially on any human element potentially delaying the transmission of data, the search window may be arbitrarily expanded further to include more buckets and to reduce the risk of failing to find desired data.

Based on what output types and/or aggregations the query will involve, the script is built up (Step 310) to include only features that will be necessary to accomplish the task. For example, a generic, pre-built solution would likely require a tree of if/else statements or case switches to test whether an output field is to be a sum (and if so, perform the addition), an average (and if so, perform the addition and division), etc. In contrast, a dynamically generated script can have code to sum or average if and only if those features are used in the query, without any conditional control structures being necessary. When said code is being executed millions or billions of times during performance of the query, the lack of unnecessary conditional structures leads to a marked improvement in performance.

Code Evaluation

Although some querying languages permit the use of regular expressions or other powerful string manipulation tools, it may be preferable to have even more powerful tools at hand. In some embodiments, additional features from Python or another scripting or programming language may be incorporated into the script to be executed as it is run. For example, a key might be defined in the query as, rather than the value of a particular column, the result when a custom-written Python function (or function in another language) is called with the value(s) of one or more columns as the function's input. As a result, much greater sophistication in queries is possible, since the values are arbitrarily malleable before the point at which retrieval, ordering, aggregation, or any other aspect of the output is performed.

Examples of use cases for incorporating a custom function into a query might include:

- a function to transform a column's output to ensure compatibility for a cross-table join on a key column, or any other normalization of data that may be necessary to change its formatting or presentation before combination with other external data that may not have been created with interoperability in mind.
- functions that can take into account an input being a primitive data type, or a more complicated object such as a set or dictionary, and applying the function to each element or attribute of the object separately.
- a decryption function, allowing raw data in one or more columns to be encrypted before storage and only decrypted at the moment a file is retrieved from storage and checked to see whether it satisfies the query.
- iteration through a set of values to perform a map reduce, or to map a function to each element in the set.
- iteration through a set of values to perform filtering and include only columns that match a more subtle or complex criterion than would be expressible without custom code written for it.
- functions that access external data sources, allowing for functionality that would not be present merely from examining the values of columns in a particular file/record.
- functions to format outputs according to an expected format, such as changing text to all lowercase and stripping out any unexpected characters in a string.
- functions to identify and remove sensitive or confidential information from returned results.
- functions to better enable "group by" aggregation logic based on known properties of the data being queried—for example, if data only contains ZIP codes, but aggregation of values by state is desired, a function might convert the ZIP code to a state using a lookup table and thereby allow for aggregation by state on the first pass through the data, rather than aggregating by ZIP code and then further aggregating by state by adding up the results of the ZIP code query.

The code to be executed need not be limited to a criterion for a query, but also may be used to format or manipulate output (i.e., after querying all records that satisfy a condition, return not the value of a particular column, but the result after executing a custom function with that column as an input); to aggregate results (i.e., group the output in sets of all records for which executing the custom function on a given column returns the same result); or even to sub-aggregate results (i.e., to perform a first aggregation, then to further aggregate those results in a second step based on a different column or criterion).

Although in theory, any arbitrary function might be allowed, in a preferred embodiment, there is an "allow list" of certain functions, lexemes, or other programming language functionality; a "disallow list" of certain other functions, lexemes, and programming language functionality; and/or a subset of programming language functionality that may be enabled or disabled as needed for a particular implementation.

For example, the allow list may include the ability to declare new functions, variables, and data structures; access to a curated list of functions that are commonly used; the ability to utilize subscript or slicing notation; the ability to utilize regular expressions; and/or the ability to declare if/then/else statements, ternary statements, switches, loops, or similar control structures. The disallow list may include any function calls to the operating system itself, any function calls that would allow for file system manipulation (including opening file streams for reading or writing, deleting files, copying files, or obtaining information on file directories and their contents), any function calls that would provide information on the environment in which the code is being executed (such as debug commands, info( ) calls, etc.), any function calls that would affect non-volatile data or otherwise create effects that will persist after the query has concluded; and/or any function calls that could allow for arbitrary code execution (such as the exec( ) function).

If code does contain any disallowed elements, it is preferable that the query attempt will fail, and a requester of the query will be notified of the reason and permitted to modify and re-submit the query.

If the code is acceptable from a allow/disallow perspective (Step 315), it may preferably be precompiled into bytecode or another intermediate format in order to retain efficiency when being re-executed on each of a multitude of records or files (Step 320). Naturally, if a particular implementation does not require this efficiency or if the nature of the programming language does not admit of precompilation before execution, this optional step may be omitted.

Although a sequence is implied by the above steps, these steps could logically be performed independently and in virtually any order, or even simultaneously through parallel processing.

A Completed Script

After the script has been fully built, the resulting Python file is preferably saved to storage 140 (Step 325) to await the computing devices 135 becoming available to execute the script on the various files in storage. Other optimizations, such as distribution of specific functions from the Python file to specific devices in a Ray cluster, may also be performed.

As a result of the dynamic script generation that only incorporates features that are foreseen as necessary from the structure of the query, object orientation and more complex design patterns are unnecessary. Instead, the resultant script merely contains whatever if/else structures and for loops are necessary to obtain the information requested by the query, with few function calls and little overhead.

The generated script contains code to attempt to take advantage of Boolean logic to short-circuit when a query is definitely satisfied or will definitely not be satisfied. For example, if there are two filters with a Boolean OR between them, the Python script will be written such that the first one to be checked is a key that is indexed, and if it is found to be present, will terminate and return the record without checking the other. If there are two filters with a Boolean AND between them, the Bloom filter part of the index may be checked first for a value of an indexed key, and if the value is not present in the Bloom filter, the search can immediately be terminated. Moreover, if there is an AND aspect to a query and any of the keys are not indexed, use of the index may be abandoned altogether, as it will be ultimately necessary to download and check each file sequentially, regardless.

When multiple filters are to be used, they are preferably expressed in disjunctive normal form, i.e., a set of sub-filters with an implicit OR disjunction between them. Thus, if it is desired to obtain all records for which "A" and "B" are columns with a true value, one would include the single sub-query as follows:

```
"filter_query" : [
        {"subquery": {"A": {"values": [True]},
                      "B": {"values": [True]}
                     }
        }
      ]
```

whereas, if it is desired to obtain all records for which "A" or "B" are columns with a true value, one would use multiple sub-queries:

```
"filter_query" : [
        {"subquery": {"A": {"values": [True]}}},
        {"subquery": {"B": {"values": [True]}}}
    ]
```

The generated code may contain a variety of checks that will be performed at runtime when the query is executed, in order to optimize performance based on the results of the initial query. For example, if a query only requests a count of records satisfying a filter, the index may be consulted to count the records in the dictionary and satisfy the query without downloading any files. If a query is for a time window that is so recent the data has not yet been indexed, or if the query does not operate on any indexed fields, all use of the indexes may be abandoned and each file sequentially checked for possible satisfaction of the query. In some circumstances, the time window overlaps both a period when indexing was completed and a period when indexing was not completed—for example, a window for the previous seven days, but indexes for the present day have not been created and only exist for data between seven days and one day old. In those circumstances, a hybrid approach will be followed where the indexes are consulted in searching through the older data, but every file among the newer data is sequentially checked.

When the script actually downloads a file to verify that it satisfies a query, all fields in the key or filter of the query are looped through and examined in sequence. Because Parquet has native support for data comparison features such as string comparison, values being less than or greater than a criterion, etc., wherever possible, elements of the query are converted into calls to Parquet's API for checking values and filtering.

For all fields in the key or filter that are not implementable via Parquet itself, code is included in the script to parse the data from Parquet and to check whether the field has an appropriate value to satisfy the query.

Finally, since Parquet does not have native support for regular expressions, any regexes used as filters may be included. These regexes can be precompiled at an earlier stage in order to avoid being compiled each time the script is run on each individual file.

Enrichment Query Preprocessing

Although the basic query syntax permits joins between two data sources that share a key, in some cases, necessary data for enabling a functionality similar to SQL's table joining may be stored in a data source external to the primary data sources being queried. For example, a log of packets sent over a network may only contain IP addresses, but a query might want to examine statistics regarding packets associated with users or departments of an organization. Accordingly, there is value in "enriching" the packet logs by combining the packet log data with a data source that associates each IP address with a user and/or department. This enrichment can be performed in any situation where a same key is shared across multiple data sources.

Figure 4:
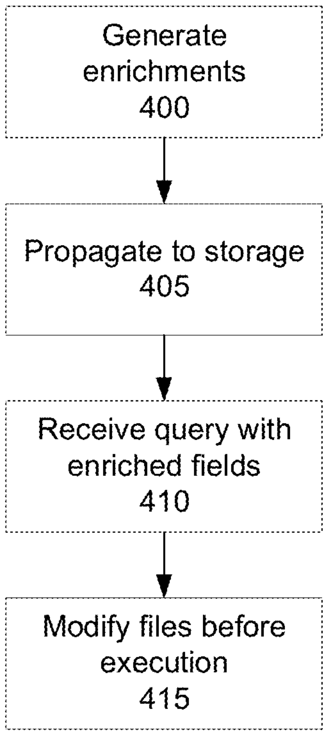
FIG. 4 illustrates, in simplified form, a method of "enriching" queries and query results by associating a field's data in a machine-readable format with a human-preferred means of expressing the same data.

FIG. 4 illustrates, in simplified form, a method of "enriching" queries and query results by associating a field's data in a machine-readable format with a human-preferred means of expressing the same data.

Enrichment is achieved by regularly generating a table of translations from a value to one or more associated values and storing them in the storage 140 to be accessed by the computing devices 135 or the re-aggregation server 155 at the time of executing the query. In a preferred embodiment, Enrichment JSONs are generated via a daily cron job or similar scheduled software process (Step 400).

After generation, the JSON (or other file format) is propagated to the storage such that it is available to each computing device (Step 405), enabling those computing devices to perform pseudo-joins without communication with any other external source or database.

When a user specifies a query, the query may have key, filtering, or output fields include one or more predefined enrichment fields (Step 410). In a preferred embodiment, the user may use a UI to select an enrichment field from a list of available enrichment fields, and doesn't need to know the "join" syntax that would be required to achieve similar functionality in an SQL database system with multiple interrelated tables.

For example, the following JSON query might be generated:

```
json_config = {
    "user" : "",
    "log_type": "external/auditd",
    "begin":
int(1000*datetime.datetime(yesterday.year,yesterday.month,yest
erday.day,0,0,0).timestamp( ) ),
    "end":
int(1000*datetime.datetime(yesterday.year,yesterday.month,yest
erday.day,0,59,59).timestamp( ) ) ,
    "s3_output_format": "single",
    "key": {
        "columns": [
            {"enrichment": "grn_hostname", "enrichment_value":
"grn"}
        ]
    },
    "enrichments": [
        {"name" : "grn_hostname", "enrichment_source": "grn",
"enrichment_path":
"reference_data/internal/host_server_enrichment/host_server_en
richment_latest.json", "enrichment_key": "hostname"},
    ],
    "output_columns": [
        {"output_name" : "count", "type": "count"},
    ]
}
```

The above JSON might be used to search for files having a hostname of "grn" and aggregate their values, even though the underlying files actually only contain IP addresses, and not hostnames.

To achieve this functionality, the data from the enrichment JSON (associating a particular IP address with a particular hostname) is automatically joined into a raw data structure with fields loaded from a Parquet file, even before the Python script begins to parse it (Step 415). As a result, the script is completely unaware that a given file did not contain the enriched information in its raw format.

Horizontal Distribution and Execution

Once a dynamic script has been generated and is ready to be executed, it must be distributed so that it can be acted on in parallel and apply the script to as many files as possible, as quickly as possible.

Figure 5:
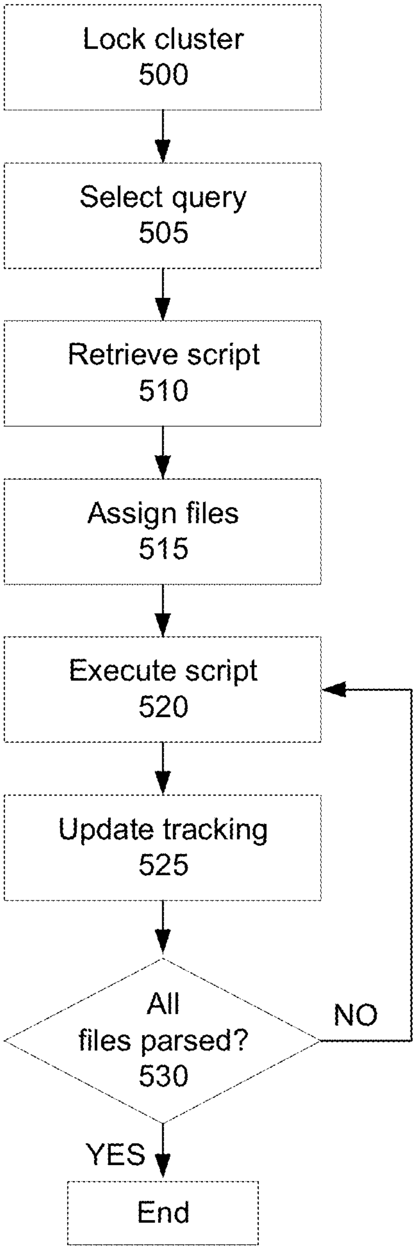
FIG. 5 illustrates, in simplified form, a method of distributing a script representing a query to a cluster of computing devices and each computing device performing the query.

FIG. 5 illustrates, in simplified form, a method of distributing a script representing a query to a cluster of computing devices and each computing device performing the query.

Initially, using the Ray cluster manager, the cluster of computing devices 135 is locked (Step 500) to ensure that they only work on one query at a time.

The next pending query is selected from the query server (Step 505) and its associated dynamically generated script is retrieved (Step 510)

In a preferred embodiment, the cluster of computing devices 135 contains 256 actual machines or 256 virtual machines distributed among a number of actual machines capable of multi-core simultaneous processing. Files from the storage 140 are preferably assigned (Step 515) to each of the computing devices 135 in a "round robin" style and/or by chunking the set of files into portions of equal size and assigning them sequentially to each of the computing devices, so that each computing device 135 receives an approximately equal 1/256 share of the files. In other embodiments, other schemes of division may be used, such as hashing files such that, if the first byte of the hash of the file represents the number N from 0 to 255, the N+1th machine or processor will retrieve that file and determine whether it satisfies the query. If fewer than 256 processors are capable of acting, files may be assigned by the value of the hash mod the number of processors; if more than 256 processors are desired, the files could be assigned based on the first 9 bits, 10 bits, etc., of the hash instead of only the first 8 bits. So long as an appropriate hashing function is used, files should be evenly distributed between the set of processors.

Each machine, for each file, executes the dynamic script (Step 520) upon that file, and tracks the output of the script for each file. If the query is returning summary or statistical data rather than records, a dictionary is created (Step 525) and used to create an entry for each value for each key in the query and updated as each file is parsed, until all files have been parsed (Step 530).

Post Processing and Aggregation

Figure 6:
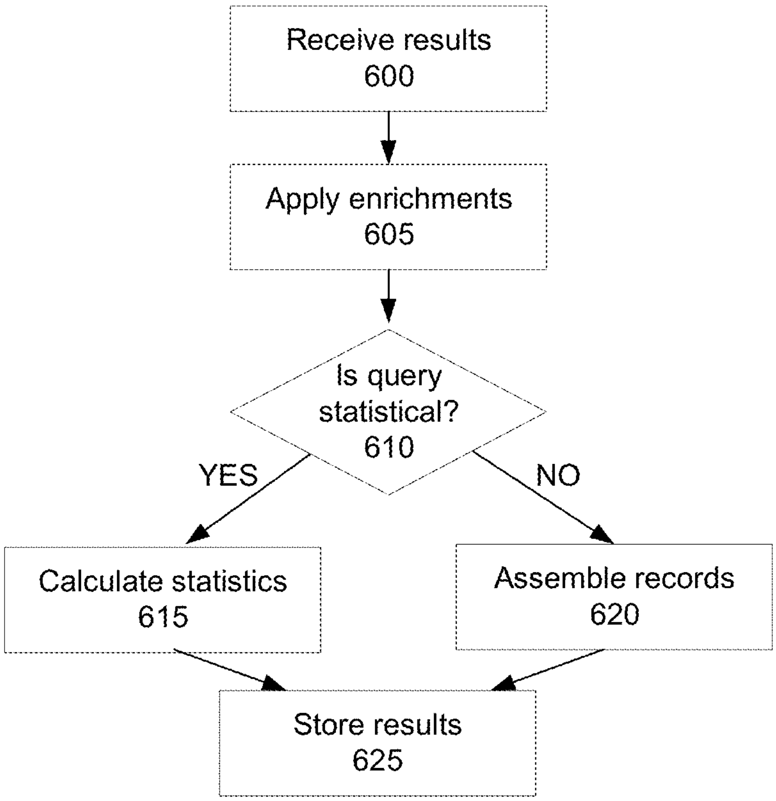
FIG. 6 depicts, in simplified form, a method for processing the separate results of the distributed query to assemble them or otherwise prepare them to be forwarded to the end user.

FIG. 6 depicts, in simplified form, a method for processing the separate results of the distributed query to assemble them or otherwise prepare them to be forwarded to the end user.

In general, every query will either request in response a union set of all records that satisfy the query, or instead request derived or assembled statistical data on each value for one or more key columns. For an example of the latter, the following query might be used to determine the total number of connection attempts made to each destination IP address during the previous 24-hour period:

```
json_config = {
    "user" : "",
    "log_type": "conn",
    "begin":
int(1000*datetime.datetime(yesterday.year,yesterday.month,yest
erday.day,0,0,0).timestamp( ) ),
    "end":
int(1000*datetime.datetime(yesterday.year,yesterday.month,yest
erday.day,0,59,59).timestamp( ) ) ,
    "s3_output_format": "single",
    "key": {
        "columns": [
            {"name" : "dest_ip", "type" : "raw" },
        ]
      },
    "output_columns": [
        {"output_name" : "count", "type": "count"}
    ],
    "filter_query" : [
                {"subquery": {"local_dest": { "values":
[True]}
            ]
}
```

When each of the computing devices 135 has obtained its intermediate results 150, they may each be provided to a re-aggregation server or cluster of servers 155 (Step 600) for combination into final results 160. If the re-aggregation functionality is being provided by a cluster of servers, it is important that work be partitioned to the servers in a deterministic way that ensures all data to be aggregated for a given key value is assigned to the same server, so that aggregation functions such as sum, max, or average have access to the full relevant data set associated with that given key value before applying the function. For example, if the numbers of incoming connections are to be summed for each IP address over a window of time, there is little value in assigning log entries randomly throughout the cluster to be summed, rather than assigning all the entries associated with a first IP address to a first server, and all entries associated with a second IP address to a second server. The partitioning may be performed by hashing the key value for each result and forwarding it to the Nth server of the cluster, where N is the hash, mod the number of servers.

The combination step acts essentially as a map reduce, applying a particular function to each of the sets of results, sorted by the key value. Alternatively, there may be no further re-aggregation required by the query, and the intermediate results 150 may be provided individually for storage or use by the requesting user.

Enrichment and Advanced Joining Functionality

If the output options include enrichments that have not yet been applied to the data, enrichments are applied (Step 605) to augment query results with additional data from external sources. This can allow even more sophisticated queries that operate on the enriched data. A significant power of data enrichment is that the enriched values can themselves be values or keys in other tabular data or unstructured data. To extend the previous example, if an IP address is being enriched to include a hostname associated with the IP address, a second data source might be organized by hostname and contain additional data that can now be associated with each IP address during aggregation. With these cross-datatype enrichments, it is possible to simulate the inner or outer join functionality provided by SQL (allowing two tables storing different data types to be joined for purposes of a query) without requiring storage of data in an SQL-compliant format. Another potential benefit of enriched data is that the data might be augmented with a more human-friendly data format or human-discernible significance. For example, in output containing IP addresses, the human user, machine name, or other useful information about the use of a given IP address might be added to aid a human user—who presumably has not memorized the IP addresses of machines in a particular network—to interpret the query results.

Even more advanced "join-type" functionality beyond this "enrichment" may also be incorporated into queries, with the joining being performed on two or more full sets of files or records with multiple columns (not merely a lookup table that associates values in a one-to-one relationship). While an enrichment would only increase the computational expense in a linear relationship to the total number of records, and increases memory only to the extent needed for the enrichment table itself, the computational and memory expense of a true join of In order for such a join to be effectively implemented, there must be one or more key columns that are shared among the datasets/tables to be joined. However, since the datasets/tables being considered may not have been designed intentionally to have a shared key structure, there are five mitigation strategies that may be employed to ensure compatibility of the datasets being joined.

First, a means of converting between fundamentally equivalent data having different datatypes may be provided. For one example, it may be that an integer userID is used in one data set, but in another the same userID is saved as a string. In such a case, conversion between datatypes will be automatically performed to ensure that records from the two data sets can be matched. For another example, one tabular data format may be keyed to a particular expression of user identity as a string, such as "firstname_lastname", while another has the integer userID. In such a case, the enrichment of data to ensure that all rows contain the string and/or the integer ID may occur first, followed by the joining occurring. For a third example, two data types might be capable of equivalence for purposes of a join because one is a subset or superset of the other, and conversion to a shared format may be possible—if one data source tracks by city and another by county or state, all cities may be converted to their county or state to enable the join; if one data source stores the date of birth of individuals, and another data source protects personally identifiable information by storing an age range for each individual, the dates of birth may be converted to age ranges to enable the join.

Second, a query may include an "expand" tag that adds a column to a given data set where it is totally absent. For example, a record of communications from a given IP address may have many different records that all share the same source IP, destination IP, port, and other features. By using an expand tag and indicating that a unique ID field should be added, every such row will have the unique ID added so that after the join has occurred, it is guaranteed that each such record is distinguishable and is not inadvertently discarded as a duplicate.

Third, an alias for a column name could be specified in a query, such that at least one of two key columns that share identical data contents under a different column name are renamed while being retrieved. For example, a table specifically devoted to communications by a particular app might have a "source_address" and "destination_address" field since the IP protocol is assumed, whereas a more general record at the router might have "sourceIP_address" and "destinationIP_address". An alias may be specified to ensure that "sourceIP_address" and "destinationIP_address" are used even for those columns that were not originally designated as those names.

Fourth, because the joining is being performed by a script that is agnostic as to the types of data being received, certain initialization of variables or data objects may have to occur prophylactically. For example, if one dataset has a field for an integer, such as "count", which is not present in another dataset, each record for the joined set should have a "count" variable created and set to zero, to be updated when/if the count variable is later calculated or otherwise becomes available. Otherwise, a script may blindly execute a command equivalent to "set count=10" and throw an error because no variable or attribute named "count" has previously been declared or allocated. Similarly, attempting to add elements to an array, set, or dictionary will fail if that array, set, or dictionary does not already exist; any field that may be augmented or appended to in this manner should be initialized in an empty state. Finally, if a data field represents an object in an object-oriented language, the object should be initialized with a default instance of the object or otherwise declared to ensure that the object is not referred to by other functionality without being able to satisfy any implicit contracts for that object/interface/its superclasses/polymorphism/etc. Proper initialization will prevent possible race conditions during aggregation, where the order in which datasets are added to a joined output affects whether references to non-existent elements can fail and throw errors.

Fifth, any filters established in a query that will affect multiple columns will be applied in such a way that they do not inadvertently filter out data that could never have conceivably matched the filter. If a filter is being performed on a key column shared by multiple tables or other data sources, the filter will be applied to each data source equally. However, if a filter refers to a column that is only present in a single data source, it will be applied only to that data source, and not to a source that lacks the column entirely. As a result, a request for all TCP/IP connections and all users associated with those connections, filtered by a particular destination IP address, will not return zero results merely because the users table lacks IP addresses. Only the connections table will be filtered by destination IP address, and then joined to the users table.

When joining, the query may indicate which key columns are required, and thereby effectively create an inner join (by specifying all keys must match), a left join (by specifying a subset of the keys that must match), or an outer join (as a default, if no requirement of any matching keys is provided, or if a set of matching keys is provided as an empty set/array).

The present advances in efficiency have permitted a scalability not seen in the prior art. For example, a three way join between tables having 500 billion, 500 billion, and 12 billion records, respectively, has been performed in under three hours, and a 1 trillion by 1 trillion join is feasible.

Preparing Output

Once the required fields are all present in their final format, depending on the nature of the query (Step 610), any statistics are calculated (Step 615) or the full set of records are assembled (Step 620) from the intermediate results 150.

If the desired statistics are as simple as a count or sum, a tracking variable may be used while iterating through each of the intermediate results 150. In some embodiments, more exotic data calculations might be performed than merely using a variable to track a sum, minimum, maximum, etc. as the results are iterated. For example, a query might request a classification of data matching filters into five classifications, without knowing in advance what the nature of the output would be. The re-aggregation server 155 might, in response, perform a k-means classification of the output for k=5 and create a new field in the data output for each record's classification.

Finally, the individual partial results 150 or final result 160 is stored (Step 625) in the storage 140 so that it can be accessed by the end user or by future scripts executing a recursive query upon query results.

In a preferred embodiment, the aggregation process uses fixed software rather than dynamically generated software as in the querying step. Efficiency gains from dynamic software at this step are somewhat diminished because the scope of the data to process has already been reduced by orders of magnitude after the distributed queries have been performed. Nevertheless, in some embodiments, it might be preferable to dynamically generate code to perform the aggregation of data results when the functions used or the type of data being aggregated could benefit from optimized code that lacks if statements or loops that will never be necessary.

Resolution of the Query

When all processing is complete and the query has been fully resolved, some basic housekeeping is performed and the results are made useful to the end user.

Figure 7:
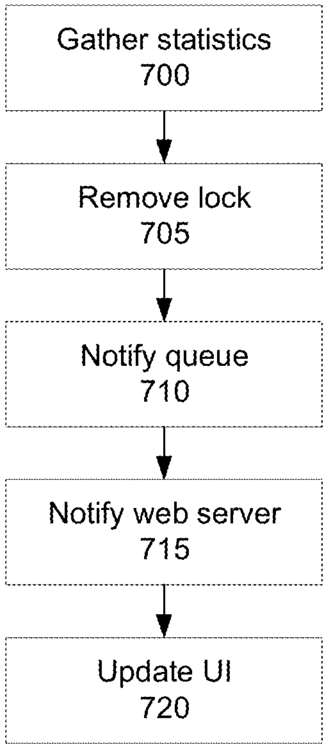
FIG. 7 depicts, in simplified form, additional steps that are performed based on any options specified by the requesting user and in order to prepare the system to execute a new query.

FIG. 7 depicts, in simplified form, additional steps that are performed based on any options specified by the requesting user and in order to prepare the system to execute a new query.

First, various statistics may be gathered (Step 700) concerning the execution of the query, such as total time, the number of files downloaded, number of records provided, and so on. These statistics may be saved for future analysis or provided to the end user along with the query results.

Next, the lock on the Ray cluster is removed to enable the cluster to process a new query (Step 705). The queueing server is notified (Step 710) that the lock has been removed and that code related to a new query can be sent to the Ray cluster.

The web server 110 is also notified that the process has been completed, to allow any web-based UI to indicate that the query is complete (Step 715). Alternatively, in embodiments lacking a user interface, the end user or the end user's software may be responsible for periodically checking the storage to determine if new files for storing results have been created and have been unlocked after writing is complete.

Depending on the nature of the results, any UI may also be updated to include all or a portion of the results (Step 720). For example, if a query only requests a count or other single statistic of all records that satisfy a query, that statistic may simply be displayed on the screen. If a query requests counts to be aggregated for each value of a particular key column, the UI may be configured to display the first five, or first one hundred, etc. key values, ordered in descending order by count numbers. If the output has been saved to an external file to which the user has access, a hyperlink or other information needed to obtain the file may be displayed via the UI.

Facilitating Statistical Analysis with Historical Records

Figure 8:
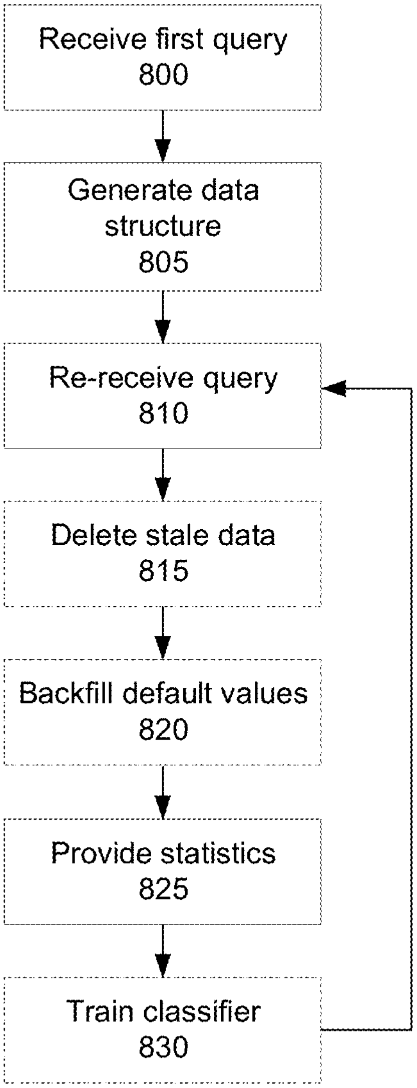
FIG. 8 depicts, depicts, in simplified form, a method of preserving output from prior queries as they are performed, in order to enable statistical analysis of a query output value over time, or other comparisons of present query results with past instances of a same query.

FIG. 8 depicts, in simplified form, a method of preserving output from prior queries as they are performed, in order to enable statistical analysis of a query output value over time, or other comparisons of present query results with past instances of a same query.

When a query is submitted according to the method described in relation to FIG. 3 and its discussion, above, the query may optionally be associated with a flag or attribute that indicates history should be tracked for the contents of one or more given output fields (Step 800). For example, a requester might wish to track how a count of a number of instances of an event or other record changes over time—tracking the number of internet connection requests received by a device per day, the number of customers matching a certain set of criteria per day, the number of files uploaded or downloaded over a connection per day, and so on. Instead of performing the query with a count output field each day and manually copying the data into other spreadsheet or statistical analysis software to track, the present system will store the output of the field when the query is re-generated and re-executed every day, supplementing the query output with useful information.

The flag on an output field for history tracking is preferably also accompanied by a flag or attribute indicating how long historical output of the query should be tracked for (for example, a most recent 30 day window, a quarterly window, or guaranteeing at least an entire month, so that the January window is discarded at the end of February and the February window is discarded at the end of March, etc.) and/or the intended frequency that the query will be performed (daily, weekly, hourly, etc.).

The first time that the query is executed, a data structure will be generated for the query and stored in a data store (Step 805). The data store may be the same data store used for caching all other query results until they are retrieved by a requester, or may be in a segregated storage to ensure that routine cleanup of the cache will not wipe out the historical data. The data structure preferably uses a "last modified" timestamp field to track when the last instance of the query was performed and its output stored, though this information might instead be inferred from timestamps attached to each element in the data structure storing output data.

The first time that the query is run, the data structure will simply have a single entry denoting that the date the query was run, the tagged field(s) had the given output, but no statistical analysis will be possible.

When the query is repeated (Step 810), two preferable cleanup stages will occur. First, any entries in the data structure older than a flag indicating how long to keep data for may be deleted (Step 815). For example, if the query is tagged to keep data for 30 days, and is executed every day, it will always have a 31-day-old entry that is to be deleted before providing any statistical analysis. Second, any missing entries may be backfilled (Step 820). For example, if the query is tagged to keep data for 30 days and has an intended daily execution, but is never executed on weekends, executing the query on Monday may result in two entries being created for Saturday and Sunday, each with zeroes or another appropriate default value for the numerical output field(s). In some embodiments, such as those where snapshots of a data store are saved, it may be possible to, rather than backfill with zeroes, determine what the output of a query would have been if it had been executed on a given day instead of in the present. In such embodiments, that information may be retroactively filled in to the data structure when possible.

After the data structure has been both pre-processed and updated with the most recent query output, various statistical analysis may be automatically performed and provided to the query requester (Step 825). This information preferably includes generalized information about the data set for the given time window: the standard deviation in a field's values, the mean and median, the boundaries between quartiles/deciles/percentiles/other quantiles, etc. The information also preferably includes information on the most recent query invocation's output in relation to that generalized information: what is today's output's z-score, is today's output above or below median, what is the percentile/other quantile of today's output in relation to other outputs in the time window, etc. Any form of statistical analysis of a numeric dataset (or of any dataset with a reasonable translation into comparable numeric data) may be implemented and provided over a rolling time window.

In more advanced embodiments, analysis may even be performed on multi-dimension or other data that is not merely a one-dimensional number. For example, a query might output a vector of multiple numeric values, and statistical analysis may take the form of a clustering algorithm or classification algorithm. Output of the statistical analysis may include as general information the location of the means in a k-means clusterer and how those means changed over the time window, or the hyperplane dividing outputs into clusters from a support vector machine, and how the hyperplane changed over time. Similarly, output of the statistical analysis may include the relative, specific information of which cluster the most recent query's invocation's output falls into. Any other machine learning system for classification or other decision making may be trained (Step 830) based on the historical data and used to automate actions that previously required human analysis.

Computing Devices and Software

Figure 9:
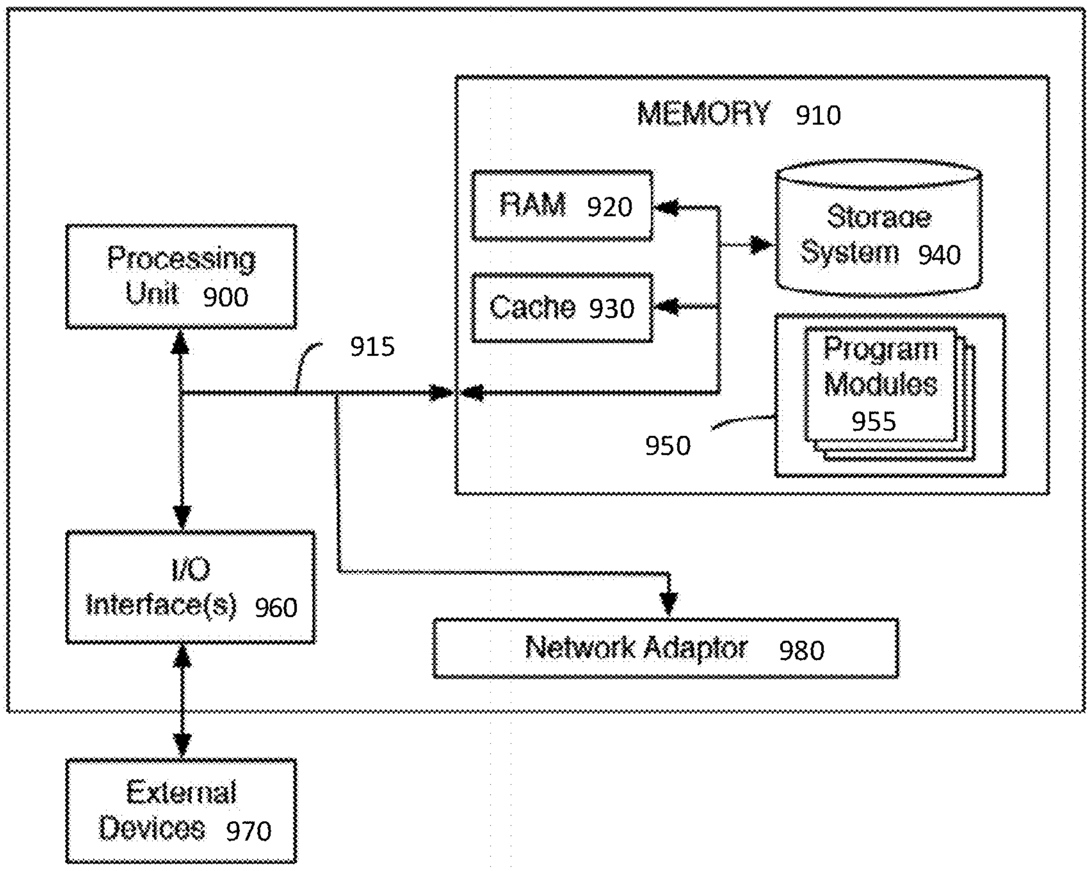
FIG. 9 is a high-level block diagram of a representative computing device that may be utilized to implement various features and processes described herein.

Although FIG. 9 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 9, below, describes various enabling devices and technologies related to the physical components and architectures described above.

FIG. 9 is a high-level block diagram of a representative computing device that may be utilized to implement various features and processes described herein, for example, the functionality of the user's computing device 100, the web server 110, the queueing server 120, the Python generation server 125, the re-aggregation server 155, each distributed computing device 135, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for dynamically generating scripts to be executed during a query of a data store, comprising:

a server comprising one or more processor; and non-transitory memory comprising instructions that, when executed by the one or more processors of the server, cause the one or more processors to:

receive a query comprising a time window of files to searched, key values to search on in two or more distinct datasets, one or more enrichment fields, and one or both of a filter selecting subset of the files to be searched and an aggregation of data from all of the files or from all of the files that are filtered;

dynamically generate a script based on contents of the query, optimizing the script from a template to include only features necessary to satisfy the query; and distribute the generated script horizontally to a plurality of computing devices;

wherein each computing device of the plurality of computing devices performs a pseudo-join that automatically integrates data from a table of translation, specified by the one or more enrichment fields, into a raw data structure with fields loaded from at least one of the two or more distinct datasets to introduce a shared enriched value;

the generated script begins to parse the raw data structure after the occurrence of the pseudo-join;

call the generated script on each of the files to be searched, wherein each of the files includes the raw data structure; and join the two or more distinct datasets into single records based upon the shared enriched value that is introduced by the pseudo-join which joins the two or more distinct datasets where no common key previously existed among the two or more distinct datasets, and output the single records in response to the query.

2. The system of claim 1, wherein the two or more distinct datasets comprise two or more key fields, respectively, having a same value stored as a different datatype, and wherein automatic conversion of datatype is performed to a shared datatype to enable a join on a same key field.

3. The system of claim 1, wherein one of the two or more distinct dataset air unstructured data and thereby lacks a key field present in another of the two or more distinct datasets, and wherein an expand tag is present in the query, causing a key field to be generated with unique values for the one of the datasets lacking the key field, and wherein the generated key field enables integration of the datasets before execution and query processing without modifying the two or more distinct datasets or requiring a predefined primary key.

4. The system of claim 1, wherein one of the two or more distinct datasets lacks at least one field present in another of the two or more distinct datasets, and wherein a placeholder value is inserted for the at least one field in every record of the one dataset.

5. The system of claim 4, wherein the at least one field an object rather than a primitive datatype, and wherein the placeholder is a default instance of the object.

6. The system of claim 4, wherein the at least one field represents a set, array, or dictionary, and wherein the placeholder is an empty instance of the set, array, or dictionary.

7. The system of claim 1, wherein the query is expressed in Javascript Object Notation (JSON) format.

8. The system of claim 1, wherein the generated script is in the Python scripting language.

9. A computer-implemented method for dynamically generating scripts to se executed during a query of a data store, comprising:

receiving a query comprising a time window of files to be searched, key values to search on in two of ore distinct datasets, one or more enrichment fields, and one or both of a filter selecting a subset of the files to be searched and an aggregation of data from all of the files or from all of the files that are filtered;

dynamically generating a script based on contents of the query, optimizing the script from a template to include on features necessary to satisfy the query;

distributing the generated script horizontally to a plurality of computing devices;

wherein each computing device of the plurality of computing devices executes the query by first performing a pseudo-join that automatically integrates data from a table of translation, specified by the one or more enrichment fields, into a raw data structure with fields loaded from at least one of the two or more distinct datasets to introduce a shared enriched value;

the generated script begins to parse the raw data structure after the occurrence of the pseudo-join;

calling the generated script on each of the files to be searched, wherein each of the files includes the raw data structure; and joining the two or more distinct datasets into single records based upon the shared enriched value that is introduced by the pseudo-join which joins the two or more distinct datasets where no common key previously existed among the two or more distinct datasets, and output the single records in response to the query.

10. The method of claim 9, wherein the two or more distinct datasets comprise two or more key fields, respectively, having a same value stored as a different datatype, and wherein automatic conversion of datatype is performed to a shared datatype to enable a join on a same key field.

11. The method of claim 9, wherein one of the two or more distinct datasets lacks a key field present in another of the two or more distinct datasets, and wherein an expand tag is present in the query, wherein the method further includes generating a key field with unique values for the two or more distinct datasets lacking the key field, and linking the two or more distinct datasets via the generated key field before execution, allowing accurate record association and query processing can occur without modifying the two or more distinct datasets or requiring a predefined primary key.

12. The method of claim 9, wherein one of the two or more distinct datasets lacks at least one field present in another of the two or more distinct datasets, and wherein a placeholder value is inserted for the at least one field in every record of the one dataset.

13. The method of claim 12, wherein the at least one field represents an object rather than a primitive datatype, and wherein the placeholder is a default instance of the object.

14. The method of claim 12, wherein the at least one field represents a set, array, or dictionary, and wherein the placeholder is an empty instance of the set, array, or dictionary.

15. The method of claim 9, wherein the query is expressed in JavaScript Object Notation (JSON) format.

16. The method of claim 9, wherein the generated script is in the Python scripting language.

* * * * *